US008857367B2

(12) United States Patent
Sloey et al.

(10) Patent No.: US 8,857,367 B2
(45) Date of Patent: Oct. 14, 2014

(54) PORTABLE ELECTRONIC DEVICES WITH MOISTURE CONTROL AND MOISTURE INDICATION FEATURES

(75) Inventors: Jason Sloey, San Jose, CA (US); John Ardisana, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 632 days.

(21) Appl. No.: 13/222,926

(22) Filed: Aug. 31, 2011

(65) Prior Publication Data

US 2013/0052848 A1 Feb. 28, 2013

(51) Int. Cl.
*H01R 13/52* (2006.01)
*H01R 3/00* (2006.01)
*G01N 21/81* (2006.01)

(52) U.S. Cl.
CPC .................................... *H01R 13/52* (2013.01)
USPC .............................................. 116/206; 73/73

(58) Field of Classification Search
CPC ........... G01D 3/08; G01D 7/00; G01D 7/005; G01N 21/81; G01N 31/22; G08B 21/00; G08B 21/18; G08B 21/20; G09F 3/00; G09F 3/02; G09F 3/0291; H04M 1/02; H04M 1/18; H01R 3/00; H01R 13/52; H01R 13/523
USPC ...................... 116/206; 73/29.02, 73, 355.01; 252/408.1, 963; 379/437, 451
See application file for complete search history.

(56) References Cited

U.S. PATENT DOCUMENTS 3,198,163 A * 8/1965 Williams ...................... 116/206
3,680,364 A * 8/1972 Carrier .............................. 73/73
4,793,180 A * 12/1988 Stewart et al. ................ 116/200
6,628,785 B1 9/2003 Kitamura et al.
2008/0134768 A1* 6/2008 Sanford et al. .................... 73/73
2009/0273480 A1 11/2009 Mittleman et al.
2010/0304091 A1 12/2010 Wang
2011/0255850 A1* 10/2011 Dinh et al. .................... 396/176
2013/0242475 A1* 9/2013 Sloey ....................... 361/679.01

FOREIGN PATENT DOCUMENTS

EP 2090328 A1 * 8/2009 ............ G01N 21/81
JP 10254360 A 9/1998
JP 2000106596 A * 4/2000 .............. H04M 1/02
JP 2001177268 A * 6/2001 ............... H05K 5/02
JP 2001312207 A * 11/2001 ................ G09F 3/02
JP 2003283619 A * 10/2003 .............. H04M 1/02

* cited by examiner

*Primary Examiner* — R. A. Smith

(74) *Attorney, Agent, or Firm* — Treyz Law Group.; Kendall P. Woodruff

(57) ABSTRACT

Connector structures for electronic devices may be provided with moisture indicators. The connector structures may include a connector such as data port connector that has a rear opening. A moisture barrier structure may cover the rear of the data port connector and may have an opening that is aligned with the rear opening. A moisture indicator may cover the opening in the moisture barrier structure. A transparent window structure such as a layer of clear film may be used to prevent moisture from traveling through the rear opening of the data port connector and the opening in the moisture barrier structure to the moisture indicator. An audio port connector may be provided with a moisture indicator and a transparent window structure that helps prevent moisture from reaching the moisture indicator through the audio port connector.

20 Claims, 7 Drawing Sheets

PORTABLE ELECTRONIC DEVICES WITH MOISTURE CONTROL AND MOISTURE INDICATION FEATURES

BACKGROUND

This relates generally to electronic devices, and more particularly, to electronic devices with moisture control and moisture indication features.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Portable electronic devices such as handheld electronic devices may contain complex electronic circuitry. Electronic components such as memory, processors, and other circuits can be highly sensitive to moisture. Too much moisture can create unintended low resistance connections between nodes that are meant to be at different voltages making the circuits perform unpredictably or malfunction. Circuits may also be adversely affected by exposure to dust or other contaminants. Because portable electronic devices may not always be operated in a controlled environment, they may be particularly likely to be exposed to moisture, dust, or other contaminants.

Electronic devices may have multiple openings for connectors such as data port connectors and audio port connectors. Data port connectors and audio port connectors are sometimes provided with dye-based moisture indicators. When exposed to water, this type of moisture indicator changes color. It can be determined whether or not an electronic device has been exposed to excessive amounts of moisture by examining the color of the moisture indicator.

In a conventional electronic device, a moisture indicator is sometimes mounted over an opening in a connector wall using adhesive. The status of the moisture indicator can be observed from the exterior of the device by looking through the connector wall opening. However, repeated exposure to moisture may cause the adhesive interface between the connector and the moisture indicator to fail. If moisture were to seep through the adhesive interface, it would be likely to reach the interior of the electronic device.

It would therefore be desirable to be able to provide electronic devices with improved moisture control and moisture indication features.

SUMMARY

Connector structures for electronic devices may be provided with moisture indicators. A moisture indicator may have a dye layer and a wicking layer. When exposed to moisture, the dye may migrate into the wicking layer to indicate that the moisture indicator has been exposed to moisture. The connector structures may include a connector such as a data port connector and a connector such as an audio jack. The connectors may have openings through which the status of the moisture indicator may be viewed.

The openings in the connectors may be formed in connector walls. For example, a rear opening may be formed in the rear wall of a data port connector or in the rear wall of an audio jack housing.

In some configurations, a plastic cap or other moisture barrier structure may be attached to the rear wall of the connector to help impede the flow of moisture. An opening may be provided in the moisture barrier structure that is aligned with the rear opening in the connector.

A moisture indicator may cover the opening in the moisture barrier structure or the rear wall opening in the connector so that the moisture indicator may be viewed through the connector from the exterior of the electronic device.

A transparent window structure such as a layer of clear film or a molded plastic lens may be used to prevent moisture from traveling through the connector to the moisture indicator. For example, in a data port connector, the transparent window structure may be used to prevent moisture from flowing through the rear wall opening in the connector and the moisture barrier opening to the moisture indicator. In an audio jack, a clear plastic lens that serves as the transparent window structure may be inserted into a slot in the audio jack to prevent moisture from flowing to the moisture indicator through a rear wall opening in the audio jack housing.

Further features of the invention, its nature and various advantages will be more apparent from the accompanying drawings and the following detailed description.

DETAILED DESCRIPTION

Electronic devices may have multiple openings for connectors such as data port connectors and audio connectors. Such openings are often provided with moisture indicators to indicate whether or not excessive amounts of moisture have reached the interior of the device. However, conventional arrangements for water indicators do not provide adequate protection against moisture ingress and often allow moisture and other contaminants to reach device interiors.

Figure 1:
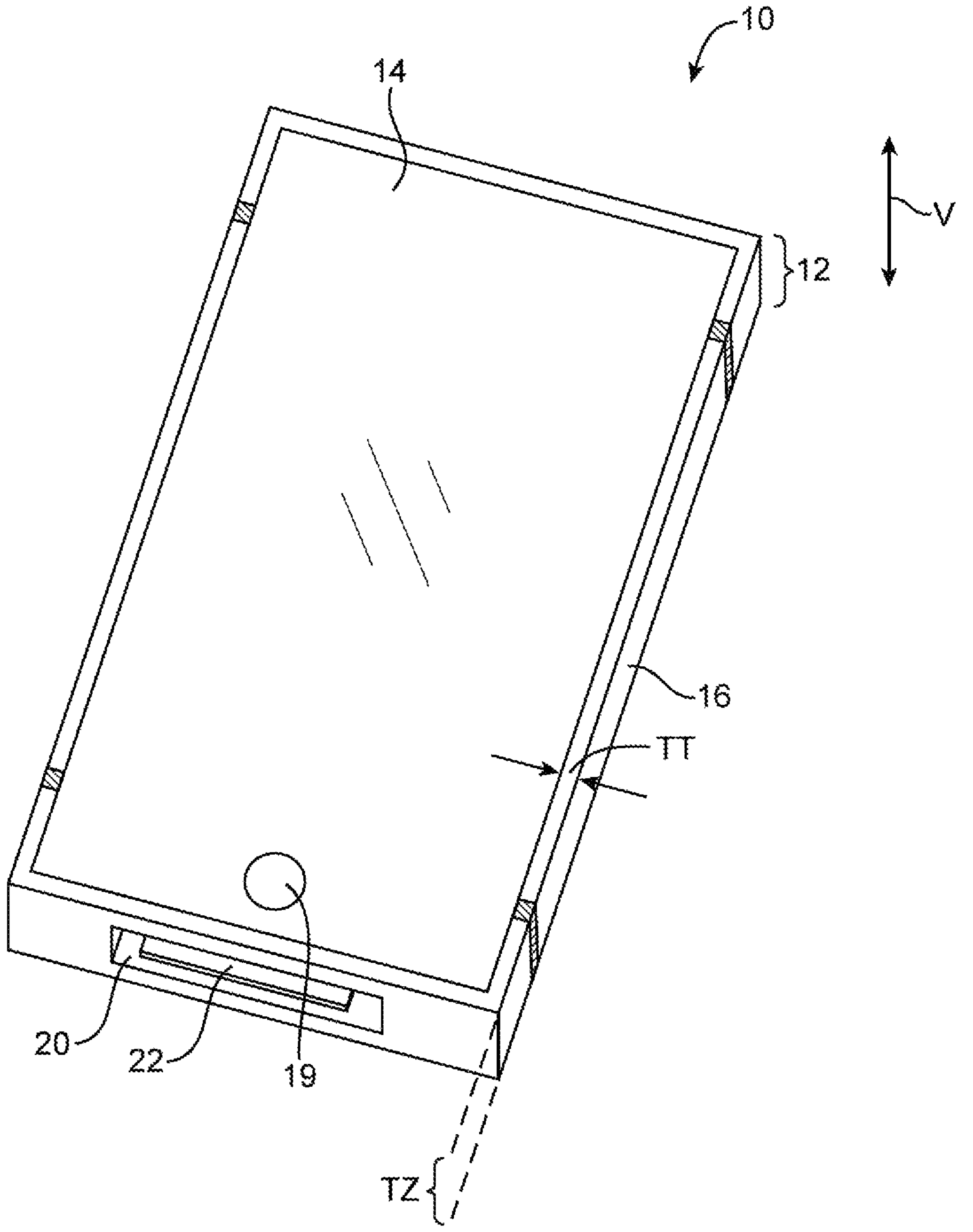
FIG. 1 is a front perspective view of an illustrative electronic device that may be provided with moisture control and moisture indication features in accordance with an embodiment of the present invention.

An illustrative electronic device of the type that may be provided with moisture control and moisture indication features is shown in FIG. 1. Electronic device 10 may be a laptop computer, a tablet computer, a somewhat smaller device such as a wrist-watch device, pendant device, headphone device, earpiece device, or other wearable or miniature device, a cellular telephone, a media player, other portable devices, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass layer may cover the surface of display 14. Buttons such as button 19 may pass through openings in the cover glass.

Housing 12 may include structures such as peripheral housing member 16. Member 16 may run around the rectangular periphery of device 10 and display 14. Member 16 or part of member 16 may serve as a bezel for display 14 (e.g., a cosmetic trim that surrounds all four sides of display 14 and/or helps hold display 14 to device 10). Member 16 may also, if desired, form sidewall structures for device 10.

Member 16 may be formed of a conductive material and may therefore sometimes be referred to as a peripheral conductive member or conductive housing structure. Member 16 may be formed from a metal such as stainless steel, aluminum, or other suitable materials. One, two, or more than two separate structures may be used in forming member 16. In a typical configuration, member 16 may have a thickness (dimension TT) of about 0.1 mm to 3 mm (as an example). The sidewall portions of member 16 may, as an example, be substantially vertical (parallel to vertical axis V). Parallel to axis V, member 16 may have a dimension TZ of about 1 mm to 2 cm (as an example). The aspect ratio R of member 16 (i.e., the ratio R of TZ to TT) may be more than 1 (i.e., R may be greater than or equal to 1, greater than or equal to 2, greater than or equal to 4, greater than or equal to 10, etc.). The value of aspect ratio R may also be less than 1.

It is not necessary for member 16 to have a uniform cross-section. For example, the top portion of member 16 may, if desired, have an inwardly protruding lip that helps hold display 14 in place. If desired, the bottom portion of member 16 may also have an enlarged lip (e.g., in the plane of the rear surface of device 10). In the example of FIG. 1, member 16 has substantially straight vertical sidewalls. This is merely illustrative. The sidewalls of member 16 may be curved or may have any other suitable shape. In some configurations (e.g., when member 16 serves as a bezel for display 14), member 16 may run around the lip of housing 12 (i.e., member 16 may cover only the edge of housing 12 that surrounds display 14 and not the rear edge of the sidewalls of housing 12).

Data ports in device 10 such as data port 20 may include power pins to recharge a battery within device 10 or to operate device 10 from a direct current (DC) power supply, and/or data pins to exchange data with external components such as a personal computer or peripheral, audio-visual jacks to drive headphones, a monitor, or other external audio-video equipment. Port 20 may be used as an input-output port (e.g., when connecting device 10 to a mating dock connected to a computer or other electronic device).

Port 20 may include a connector such as data port connector 22. Connector 22 may be a 30-pin data port female connector (e.g., a jack) that receives a mating 30-pin data port male connector (e.g., a plug). Port 20 and connector 22 may sometimes be referred to as a dock connector. Other examples of connector types that may be used in implementing connector 22 include Universal Serial Bus (USB) connectors, mini USB connectors, FireWire® connectors, Ethernet connectors, audio connectors such as TRRS connectors, video connectors such as Digital Video Interface (DVI), Video Graphics Array (VGA), and High-Definition Multimedia Interface (HDMI) connectors, Mini DisplayPort connectors, other types of connectors, etc. The use of a data port connector 22 in FIG. 1 is merely illustrative.

Connector ports are sometimes provided with dye-based moisture indicators. When exposed to water or other liquids, this type of moisture indicator changes color (e.g., from white to red). It can therefore be determined whether or not the electronic device has been exposed to excessive amounts of moisture by examining the color of the moisture indicator.

Figure 2:
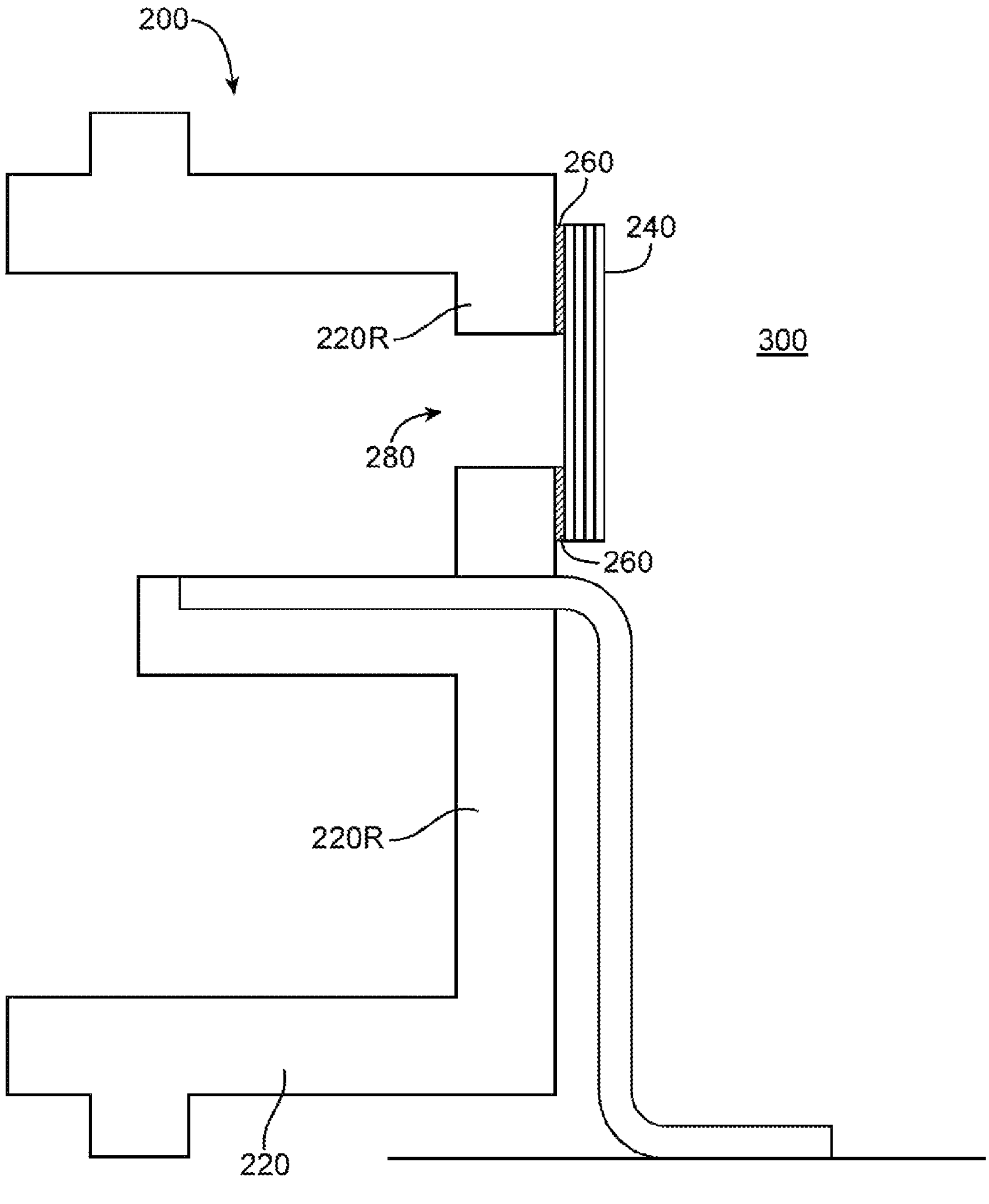
(PRIOR ART) FIG. 2
FIG. 2 is a cross-sectional side view of a portion of a conventional electronic device showing how a moisture indicator is typically employed in a connector port.

FIG. 2 is a cross-sectional side view of a device in the vicinity of port 200 illustrating a conventional arrangement for employing the use of a moisture indicator. Opening 280 in rear wall 220R of connector 220 is typically covered with moisture indicator 240. Moisture indicator 240 includes a wicking layer and a dye layer. Front and rear moisture barrier layers cover the wicking layer and the dye layer. Adhesive layer 260 is used to mount moisture indicator 240 behind opening 280 in rear wall 220R. The status of moisture indicator 240 is determined by looking through opening 280 in rear wall 220R.

This arrangement presents a high risk for moisture ingress because adhesive 260 is prone to failure when exposed to excessive amounts of moisture. If adhesive 260 were to fail, moisture would be able to seep through adhesive 260 to interior 300 of the device.

Figure 3:
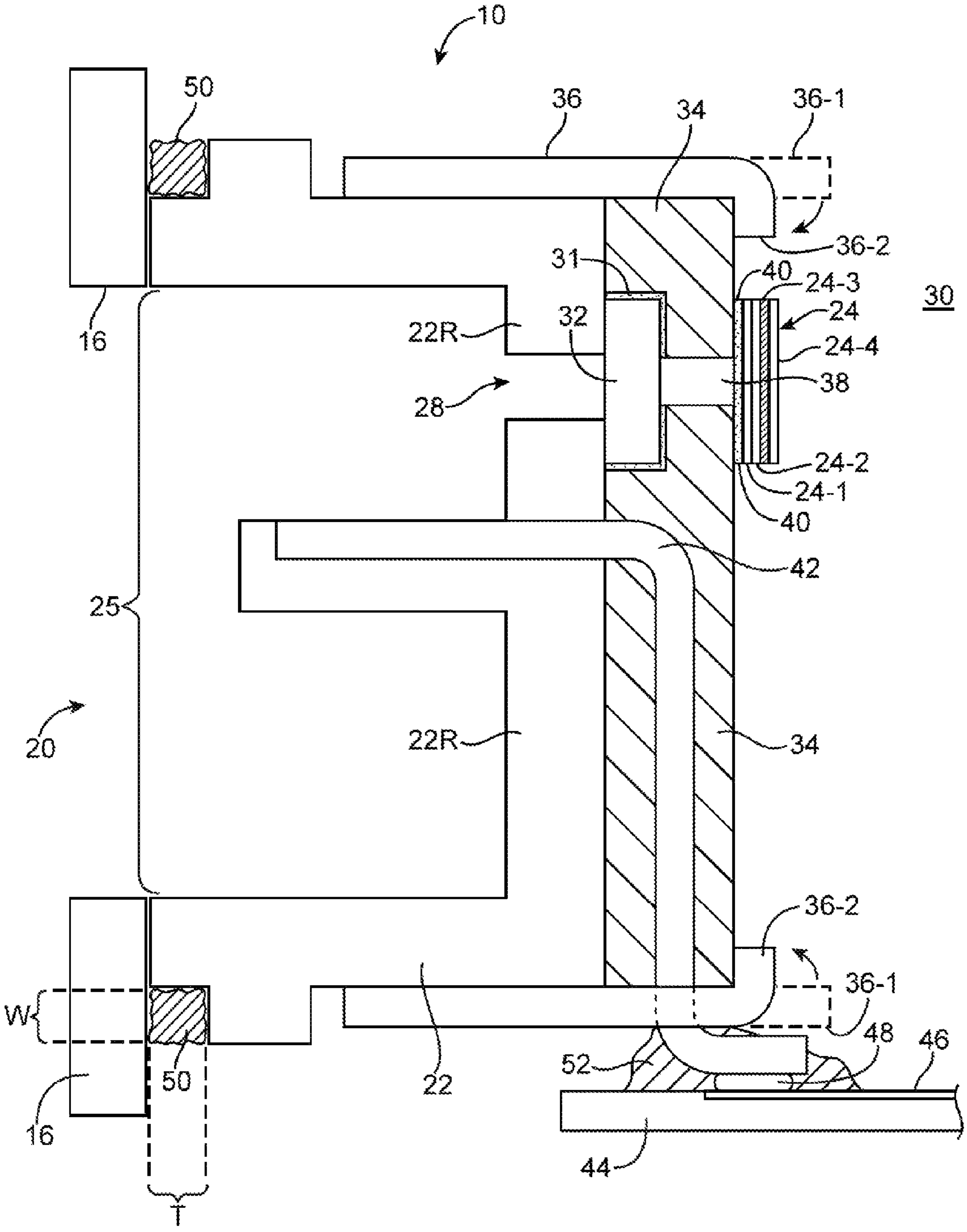
FIG. 3 is a cross-sectional side view of a portion of an electronic device of the type shown in FIG. 1 showing a connector port with moisture control and moisture indication features in accordance with an embodiment of the present invention.

FIG. 3 is a cross-sectional side view of device 10 in the vicinity of port 20 illustrating how this possible failure mechanism may be addressed. As shown in FIG. 3, a connector such as connector 22 may have a rear wall and a plurality of side walls. A wall opening such as connector wall opening 28 may be formed in rear wall 22R of connector 22. If desired, wall opening 28 may be formed in any one of the plurality of side walls of connector 22. The use of rear wall 22R of FIG. 3 is merely illustrative.

A moisture barrier structure such as moisture barrier structure 34 (sometimes referred to as a cap member or cap) may be formed over rear wall 22R of connector 22. If desired, moisture barrier structure 34 may be formed over any one of the plurality of side walls of connector 22. The use of rear wall 22R as shown in FIG. 3 is merely illustrative. Barrier structure 34 may be formed from a dielectric such as glass, ceramic, or plastic, metals, fiber-based composites, other suitable materials, or a combination of these materials. With one illustrative configuration, moisture barrier structure 34 may be implemented as a molded plastic cap. Moisture barrier structure 34 may have an opening (sometimes referred to as a channel or passageway) such as barrier opening 38. Barrier opening 38 may be aligned with connector wall opening 28.

A window such as transparent window structure 32 (sometimes referred to as a lens or a moisture indication window) may be interposed between connector wall opening 28 and barrier opening 38. Adhesive 31 may be used to attach transparent window structure 32 to moisture barrier structure 34. If desired, adhesive 31 may be used only on the edges and rear surface of transparent window structure 32 so as not to impose undesired additional thickness at the interface between moisture barrier structure 34 and the rear surface of connector wall 22R. Transparent window structure 32 may be formed from reflow-temperature-tolerant plastic film or other transparent material (e.g., plastic, glass, ceramic, etc.). Window structure 32 may range in thickness from about 0.1 mm to about 0.2 mm, may be less than 0.3 mm thick, may be less than 0.2 mm, or may be less than 0.1 mm (as examples). Window 32 may be rectangular, circular, may have a shape with straight edges and curved edges, or may have other suitable shapes.

A retention structure such as metal shell structure 36 may be formed over upper and lower surfaces of connector 22 and moisture barrier structure 34 to help hold moisture barrier structure 34 to the rear of connector 22. Shell structure 36 may initially have unbent tabs 36-1 that protrude over the edge of barrier structure 34 towards interior 30 of device 10. By bending tabs 36-1 of shell structure 36 over barrier structure 34 into the position shown by bent tabs 36-2 of FIG. 3, metal shell 36 may serve to fasten barrier structure 36 to connector 22. Metal shell 36 may be formed from a thin sheet of stainless steel, aluminum, or other metals, or other suitable materials.

A moisture indicator such as moisture indicator 24 may mounted to moisture barrier structure 34 to cover barrier opening 38. Moisture indicator 24 may have a wicking layer such as white paper layer 24-2 adjacent to a dye layer such as red dye layer 24-3. Layers 24-2 and 24-3 may be sandwiched between opposing plastic film layers 24-1 and 24-4. Adhesive such as adhesive 40 may be used to mount moisture indicator 24 over barrier opening 38. The status of moisture indicator 24 may be determined by looking through connector opening 25, wall opening 28, window structure 32, and barrier opening 38.

Window structure 32 may impede the flow of moisture through openings in the connector towards the moisture indicator. This arrangement may therefore provide increased protection against moisture ingress while still preserving the ability of a technician to view the status of the moisture indicator. Moisture barrier structure 34 may force moisture to travel longer and more complex paths before reaching interior 30 of device 10 and may therefore also help to impede the flow of moisture into interior 30 of device 10 through the connector. Positioning moisture indicator 24 farther into interior 30 of device 10 may reduce moisture exposure, while window structure 32 and opening 38 may allow the status of moisture indicator 24 to remain visible from the exterior of the device.

Port 20 may include conductive signal contact leads such as conductive signal contact leads 42 (e.g., contact pins or contacts) formed in connector 22. There may be twenty to forty laterally spaced contact leads formed in connector 22 (as an example). Contact lead 42 may be formed from a thin piece of conductor (e.g., copper, plated copper, brass, other metals, or other conductive materials).

Device 10 may contain printed circuit boards such as printed circuit board 44 shown in FIG. 3. Printed circuit board 44 and the other printed circuit boards in device 10 may be formed from rigid printed circuit board material (e.g., fiberglass-filled epoxy) or flexible sheets of material such as polymers. Flexible printed circuit boards ("flex circuits") may, for example, be formed from flexible sheets of polyimide.

Printed circuit board 44 may contain interconnects such as interconnect 46. Interconnect 46 may be formed from conductive traces such as traces of gold-plated copper or other metals. Solder 48 (e.g., solder paste that has been melted using a reflow oven or other source of heat) may be formed between interconnect 46 and contact lead 42 to electrically connect connector 22 with printed circuit board 44. Window structure 32 may be able to withstand solder reflow oven temperatures (e.g., 250° C. or more) and may therefore be applied before contact leads 42 have been soldered to printed circuit board 44. An encapsulant such as encapsulant 52 may be formed over contact lead 42 and solder 48 to encapsulate solder 48. Integrated circuits, discrete components such as resistors, capacitors, and inductors, and other electronic components may be mounted to printed circuit board 44.

Connector 22 may be at least partially enclosed by housing structures in device 10 such as peripheral housing member 16. Gaps between connector 22 and peripheral member 16 may allow moisture to penetrate to interior 30 of device 10. To close gaps between connector 22 and peripheral housing member 16, a gasket or other moisture-resistant sealing structure such as adhesive gasket 50 may be formed between connector 22 and peripheral housing member 16. Gasket 50 may have a thickness T of about 0.15 mm to about 0.25 mm and may have a width W of about 0.25 mm to 0.48 mm. Adhesive gasket 50 may be formed from pressure sensitive adhesive (PSA), epoxy, or other suitable adhesives. Adhesive gasket 50 may be used to moisture-seal connector 22 to peripheral member 16 such that moisture is prevented from reaching interior 30 of electronic device 10. Adhesive gasket 50 may be used to moisture-seal connector 22 to other housing structures in device 10. The use of peripheral housing member 16 of FIG. 3 is merely illustrative.

Figure 4:
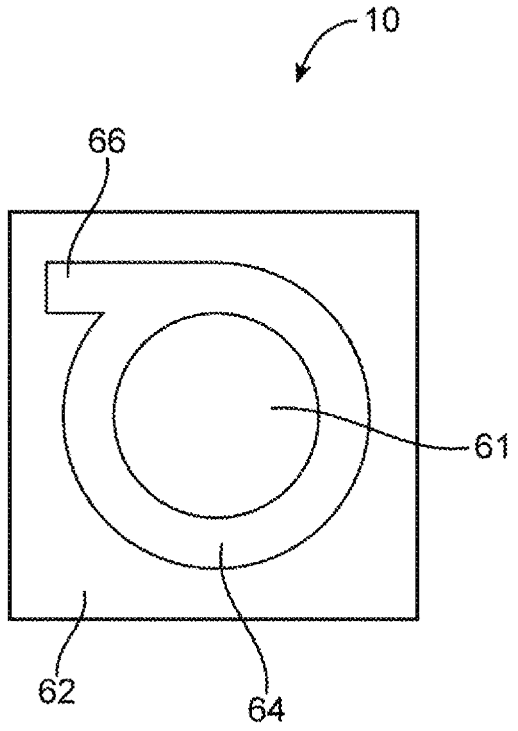
FIG. 4 is a top view of a portion of an electronic device showing an audio jack port that may be provided with moisture control and moisture indication features in accordance with an embodiment of the present invention.

In addition to connector port 20, device 10 may have an audio jack port configured to receive a mating audio plug. A top view of device 10 in the vicinity of an audio jack port such as audio jack port 60 is shown in FIG. 4. Audio jack port 60 (sometimes referred to as an audio connector) may be provided with a connector housing structure such as audio jack housing 62. Audio jack housing 62 may be formed from plastic or other suitable material. Circular opening 61 may receive the barrel of a mating audio plug (e.g., a ⅛" tip-ring-ring-sleeve (TRRS) or tip-ring-sleeve (TRS) audio plug). Audio jack port 60 may have a raised border such as raised border 64. Raised border 64 may be formed from plastic or other suitable material. Raised border 64 may contain alignment features such as alignment feature 66.

Figure 5:
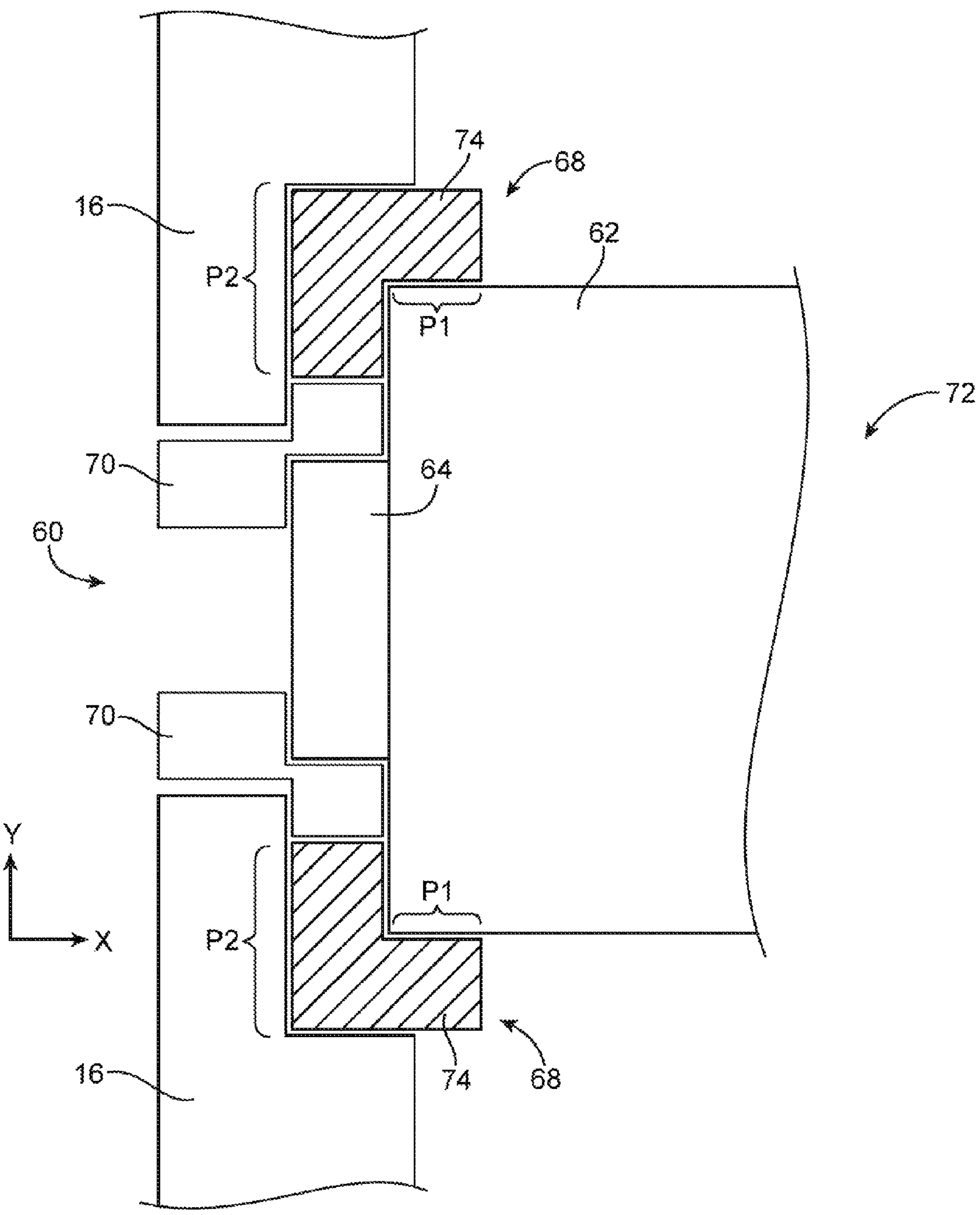
FIG. 5 is a cross-sectional view of a portion of an electronic device showing an audio jack port in which the junction between the audio jack housing and electronic device housing may be moisture-sealed in accordance with an embodiment of the present invention.

Alignment feature 66 of FIG. 4 may be configured to align with housing structures such as audio port housing trim structure 70 of FIG. 5. Trim structure 70 may be formed from plastic or other suitable material. Audio jack port 60 may be at least partially enclosed by housing structures in device 10 such as peripheral housing member 16 and trim structure 70. Gaps between audio jack housing 62 and peripheral housing member 16 or between audio jack housing 62 and trim structure 70 may allow moisture to penetrate to interior 72 of device 10. The junction between audio jack housing 62 and peripheral housing member 16 and the junction between audio jack housing 62 and trim structure 70 may be moisture-sealed using a gasket (sealing boot) such as elastomeric gasket 74 of FIG. 5 or other moisture-resistant sealing structure.

Elastomeric sealing structure 74 may have one portion P1 that is sandwiched between audio jack port housing 62 and peripheral housing member 16 and that is parallel to the X-axis shown in FIG. 5. Elastomeric sealing structure 74 may have a second portion P2 that that is sandwiched between audio jack port housing 62 and peripheral housing member 16 and that is parallel to the Y-axis shown in FIG. 5. Second portion P2 of elastomeric sealing structure 74 may bear against trim structure 70. Elastomeric sealing structure 74 may be formed from a flexible polymer such as silicone or other elastomeric sealing material. Elastomeric sealing structure 74 may provide increased protection against moisture reaching interior 72 of device 10 by moisture-sealing the junction between audio jack housing 62 and peripheral housing member 16 and the junction between audio jack housing 62 and trim structure 70.

Audio jack ports are often provided with dye-based moisture indicators. When exposed to moisture, this type of indicator changes color. It can therefore be determined whether or not the electronic device has been exposed to excessive amounts of moisture by examining the color of the moisture indicator.

Figure 6:
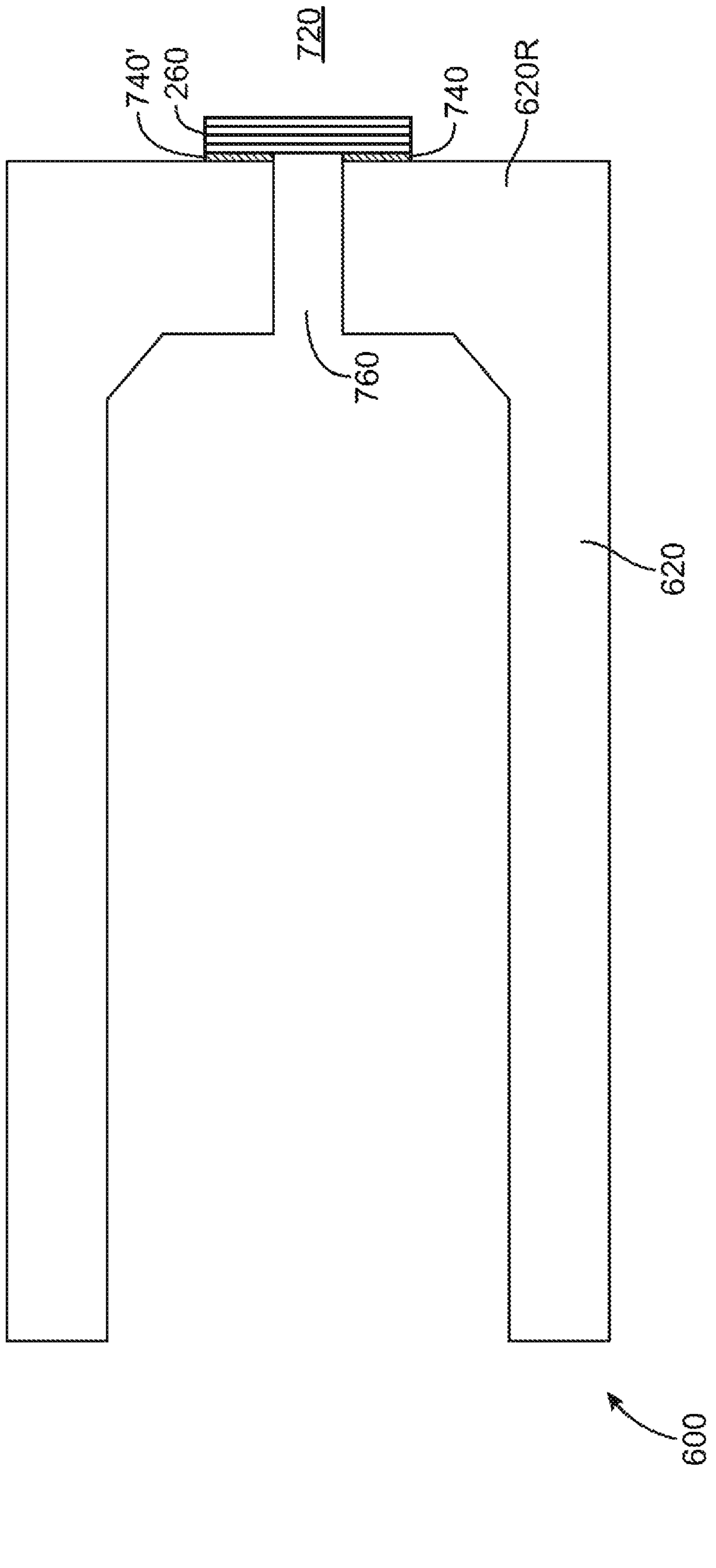
(PRIOR ART) FIG. 6
FIG. 6 is a cross-sectional view of a portion of a conventional electronic device showing how a moisture indicator is typically employed in an audio jack port.

FIG. 6 is a cross-sectional view of a device in the vicinity of audio jack port 600 illustrating a conventional arrangement for employing the use of a moisture indicator. Opening 760 in rear wall 620R of audio jack housing 620 is typically covered with moisture indicator 260. Moisture indicator 260 includes a wicking layer and a dye layer. Front and rear moisture barrier layers cover the wicking layer and the dye layer. Adhesive layer 740 is used to mount moisture indicator 260 behind opening 760 in rear wall 620R of audio jack port housing 620. The status of moisture indicator 260 is determined by looking through opening 760.

This conventional arrangement can present a high risk for moisture ingress because adhesive 740 is prone to failure when exposed to excessive amounts of moisture. If moisture were to seep through adhesive layer 740, it would likely reach interior 720 of the device.

Figure 7:
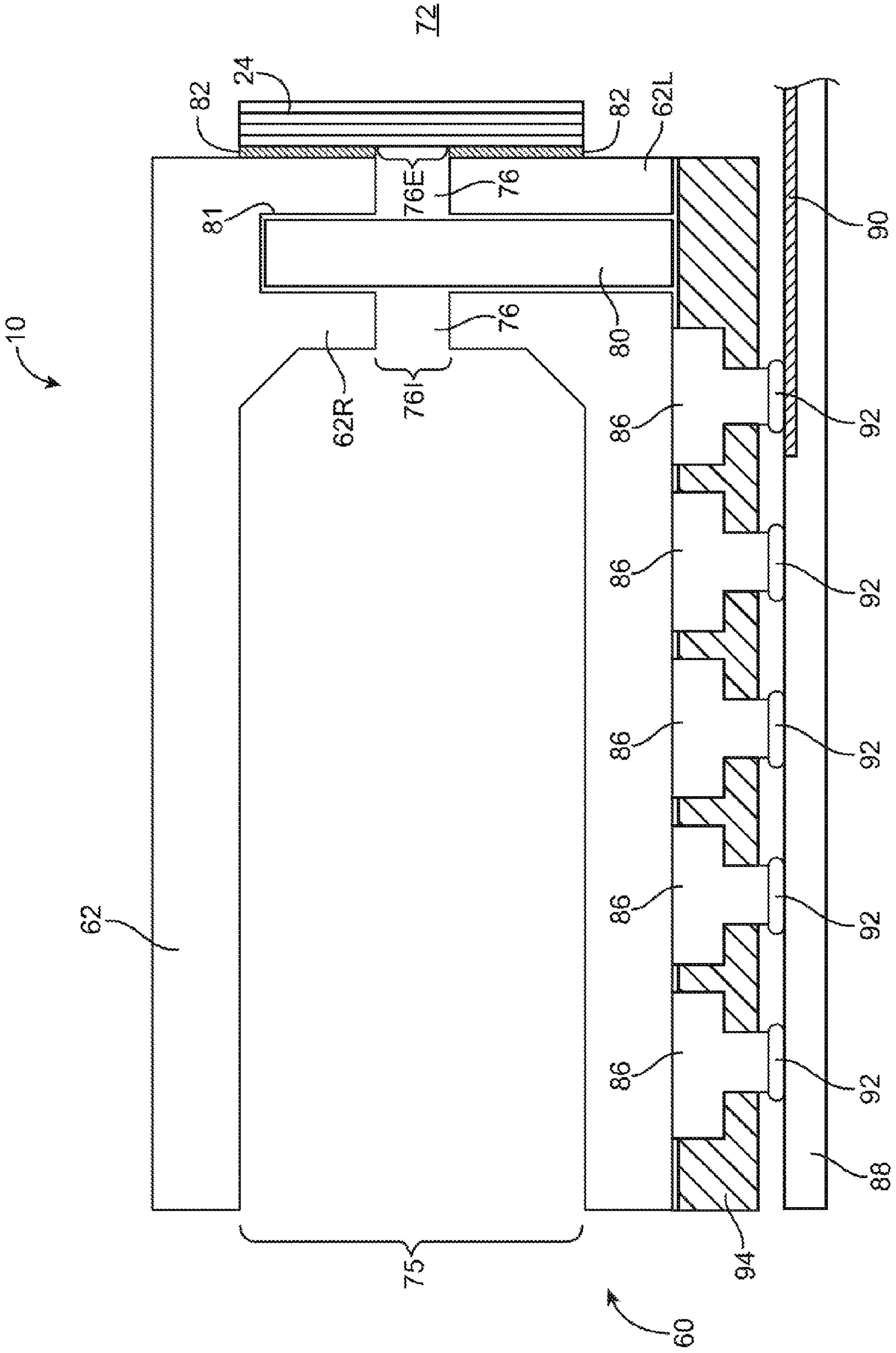
FIG. 7 is a cross-sectional view of a portion of an electronic device of the type in FIG. 1 showing an audio jack port with moisture control and moisture indication features in accordance with an embodiment of the present invention.

FIG. 7 is a cross-sectional view of device 10 in the vicinity of audio jack port 60 illustrating how the likelihood of unwanted moisture intrusion may be reduced. A transparent window structure such as transparent window structure 80 (sometimes referred to as a lens or moisture indication window) may be formed inside a cavity or slot in the audio jack housing such as recess 81 in rear wall 60R of audio jack housing 62 or at other suitable locations between the interior of audio jack housing 62 and moisture indicator 24.

Moisture indication window 80 may be formed from molded clear plastic or other transparent materials (e.g., glass, ceramic, etc.). Moisture indication window 80 may have a rectangular shape, a circular shape, or other suitable shape.

Audio jack housing 62 may have a wall opening such as opening 76. Opening 76 in audio jack housing 62 may have a circular cross section, a rectangular cross section, or may have other cross-sectional shapes (e.g., shapes with curved edges, shapes with straight edges, shapes with combinations of one or more curved edges and one or more straight edges, etc.). For example, opening 76 may have first and second opposing ends such as ends 76I and 76E that are formed from circular openings in audio jack housing 62.

Transparent window structure 80 may be mounted at the entrance to opening 76, may be interposed between ends 76I and 76E partway along the length of opening 76, may be located over end 76E of opening 76 or may otherwise be placed in a location along opening 76 that helps impede the flow of moisture into the interior of device 10 through opening 76.

As shown in FIG. 7, for example, transparent window structure may intersect opening 76 so that part of opening 76 is present on both sides of moisture indication window 80. To hold moisture indication window 80 in place within recess 81 and audio jack housing 62, a retention structure may be provided. The retention structure may be formed from a layer of retaining material such as retaining tape 94 and may be formed over at least part of lower surface 62L of audio jack housing 62. Retaining tape 94 may be formed from polyimide material or other suitable material. If desired, other retention mechanisms may be used for retaining moisture indication window (e.g., fasteners such as screws, adhesive, snaps or other engagement features, etc.).

End 76E of opening 76 in rear wall 62R of audio jack port housing 62 may be covered with a moisture indicator such as moisture indicator 24. An adhesive such as adhesive 82 may be used to mount moisture indicator 24 over end 76E of opening 76 in rear wall 62R. The status of moisture indicator 24 may be determined by looking through audio connector opening 75, wall opening 76, and moisture indication window 80. This arrangement may provide increased protection against moisture reaching interior 72 of device 10, while moisture indication window 80 and opening 76 may allow the status of moisture indicator 24 to remain visible from the exterior of the device.

Audio ports that are used in connecting an electronic device to external equipment may have any suitable number of electrical terminals. The electrical terminals in a connector are formed from conductive materials such as metal and are typically referred to as contacts. As shown in FIG. 7, audio jack port 60 may be provided with electrical contacts such as electrical contacts 86. If desired, audio jack port 60 may contain two, three, four, five, or more than five contacts. The use of five contacts in audio jack port 60 shown in FIG. 7 is merely illustrative. Electrical contacts 86 may be soldered to a printed circuit board such as printed circuit board 88. Printed circuit board 88 may be formed from rigid printed circuit board material (e.g., fiberglass-filled epoxy) or flexible sheets of material such as polymers. Flexible printed circuit boards ("flex circuits") may, for example, be formed from flexible sheets of polyimide.

Printed circuit board 88 may contain interconnects such as interconnect 90. Interconnect 90 may be formed from conductive traces (e.g., traces of gold-plated copper or other metals). Solder 92 (e.g., solder paste that has been melted using a reflow oven or other source of heat) may be formed between interconnect 90 and contact 86 in order to electrically connect an inserted audio jack plug with printed circuit board 88. Retaining tape 94 may have openings that receive electrical contacts 86 so that tape 94 surrounds at least part of electrical contacts 86 and serves to electrically insulate contacts 86. Retaining tape 94 may be able to withstand solder reflow oven temperatures (e.g., 250° C. or more, as an example) and may therefore be applied before electrical contacts 86 have been soldered to printed circuit board 88.

The foregoing is merely illustrative of the principles of this invention and various modifications can be made by those skilled in the art without departing from the scope and spirit of the invention.

What is claimed is:

1. A connector assembly, comprising:

a connector having at least one connector wall with a connector wall opening;

a moisture barrier structure covering at least part of the connector wall, wherein the moisture barrier structure includes a barrier opening that aligns with the connector wall opening;

a transparent window structure interposed between the connector wall opening and the barrier opening; and a moisture indicator that covers the barrier opening.

2. The connector assembly defined in claim 1 further comprising:

a metal shell that surrounds at least part of the connector and at least part of the moisture barrier structure.

3. The connector assembly defined in claim 1 wherein the moisture indicator includes a wicking layer and a dye layer.

4. The connector assembly defined in claim 3 further comprising adhesive that attaches the moisture indicator to the moisture barrier structure over the barrier opening.

5. The connector assembly defined in claim 1 wherein the transparent window structure is formed from clear plastic film and wherein the clear plastic film is attached to the moisture barrier structure using adhesive.

6. An audio jack assembly, comprising:

an audio jack housing having at least one wall with a wall opening having opposing first and second ends;

a transparent window structure in the wall opening interposed between the first and second ends; and a moisture indicator that covers the wall opening at the second end.

7. The audio jack assembly defined in claim 6 wherein the audio jack housing has a recess that receives the transparent window structure so that the transparent window structure intersects with the wall opening.

8. The audio jack assembly defined in claim 7 further comprising:

a retention structure that holds the transparent window structure within the recess.

9. The audio jack assembly defined in claim 8 wherein the retention structure comprises tape that covers the recess and the transparent window structure to hold the moisture indication window within the recess.

10. The audio jack assembly defined in claim 9 wherein the tape comprises openings through which electrical contacts protrude.

11. The audio jack assembly defined in claim 6 wherein the transparent window structure is formed from molded clear plastic.

12. The audio jack assembly defined in claim 6 wherein the moisture indicator includes a wicking layer and a dye layer and wherein the moisture indicator is attached over the second end of the wall opening with adhesive.

13. An electronic device, comprising:

housing structures;

a connector having a first opening and a second opening;

a sealing structure that surrounds the first opening and seals the connector to the housing structures;

a moisture indicator viewable through the second opening; and a transparent window structure configured to prevent moisture from flowing through the second opening to the moisture indicator.

14. The electronic device defined in claim 13 wherein the sealing structure comprises an adhesive gasket.

15. The electronic device defined in claim 14 wherein the second opening has opposing first and second ends and wherein the transparent window structure covers the second end.

16. The electronic device defined in claim 15 wherein the transparent window structure comprises a clear film.

17. The electronic device defined in claim 16 further comprising a plastic cap that is attached to the connector and that has a third opening, wherein the moisture indicator is attached over the third opening with adhesive.

18. The electronic device defined in claim 13 wherein the sealing structure comprises an elastomeric boot.

19. The electronic device defined in claim 18 wherein the connector comprises an audio jack housing, wherein the second opening has opposing first and second ends, and wherein the transparent window structure is interposed between the first and second ends within the second opening.

20. The electronic device defined in claim 19 wherein the transparent window structure comprises a molded clear plastic member and wherein the moisture indicator is attached over the second end with adhesive.

* * * * *